United States Patent
Fischer

(10) Patent No.: US 10,364,713 B2
(45) Date of Patent: Jul. 30, 2019

(54) MOTOR VEHICLE DRIVETRAIN CONTROLLER

(71) Applicant: GM GLOBAL TECHNOLOGY OPERATIONS LLC, Detroit, MI (US)

(72) Inventor: Hartmut Fischer, Ruesselsheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 173 days.

(21) Appl. No.: 15/439,598

(22) Filed: Feb. 22, 2017

(65) Prior Publication Data

US 2017/0241306 A1    Aug. 24, 2017

(30) Foreign Application Priority Data

Feb. 22, 2016 (DE) .......................... 10 2016 002 051

(51) Int. Cl.
    *F01L 13/08*      (2006.01)
    *F01L 1/20*      (2006.01)
    (Continued)

(52) U.S. Cl.
    CPC ....... *F01L 13/08* (2013.01); *B60W 30/18072* (2013.01); *F01L 1/20* (2013.01); *F01L 13/04* (2013.01); *F02N 19/004* (2013.01); *B60W 2030/18081* (2013.01); *F01L 9/02* (2013.01); *F01L 9/026* (2013.01); *F01L 9/04* (2013.01);
    (Continued)

(58) Field of Classification Search
None
See application file for complete search history.

(56) References Cited

U.S. PATENT DOCUMENTS 5,873,335 A * 2/1999 Wright ...................... F01L 9/04
                                                       123/198 D
6,470,851 B1 * 10/2002 DeGroot ................. F01L 13/06
                                                       123/198 DB (Continued)

FOREIGN PATENT DOCUMENTS

DE           19953513 A1     5/2001
DE      102011006288 A1    10/2012

(Continued)

OTHER PUBLICATIONS

German Patent Office, German Search Report for German Application No. 10 2016 002 051.2, dated Oct. 20, 2016.

*Primary Examiner* — Mark A Laurenzi
*Assistant Examiner* — Wesley G Harris
(74) *Attorney, Agent, or Firm* — Lorenz & Kopf, LLP

(57) ABSTRACT

A method for controlling a drivetrain of a motor vehicle is disclosed. Either a start mode for starting the reciprocating engine is activated via the driving vehicle wheel, or a coasting mode is activated for driving the reciprocating engine via the driving vehicle wheel. At least one volume-reducing stroke is executed that follows an intake stroke for at least one cylinder of the reciprocating engine with at least intermittently open cylinder. Alternately at least one volume-enlarging stroke is executed for at least one cylinder of the reciprocating engine, which is followed by a compression stroke of this cylinder, and at least one volume-reducing stroke of this cylinder, which follows an expansion stroke that follows the compression stroke, with a cylinder that is closed, if possible, in this operating mode.

19 Claims, 1 Drawing Sheet

(51) Int. Cl.
     *F01L 13/04*     (2006.01)
     *F02N 19/00*     (2010.01)
     *F01L 9/02*     (2006.01)
     *F01L 9/04*     (2006.01)
     *B60W 30/18*     (2012.01)
     *F01L 1/053*     (2006.01)

(52) U.S. Cl.
     CPC ... *F01L 2001/0537* (2013.01); *F01L 2800/01* (2013.01); *F01L 2820/01* (2013.01)

(56) References Cited

U.S. PATENT DOCUMENTS

| | | | |
|---|---|---|---|
| 2002/0157623 A1* | 10/2002 | Turner | F01L 9/02 123/90.12 |
| 2003/0140876 A1* | 7/2003 | Yang | F01L 9/04 123/90.12 |
| 2005/0087169 A1 | 4/2005 | Yoshida et al. | |
| 2006/0243229 A1* | 11/2006 | Zajac | F01B 31/14 123/70 R |

FOREIGN PATENT DOCUMENTS

| | | |
|---|---|---|
| DE | 102011078913 A1 | 1/2013 |
| DE | 102013210266 A1 | 12/2014 |

\* cited by examiner

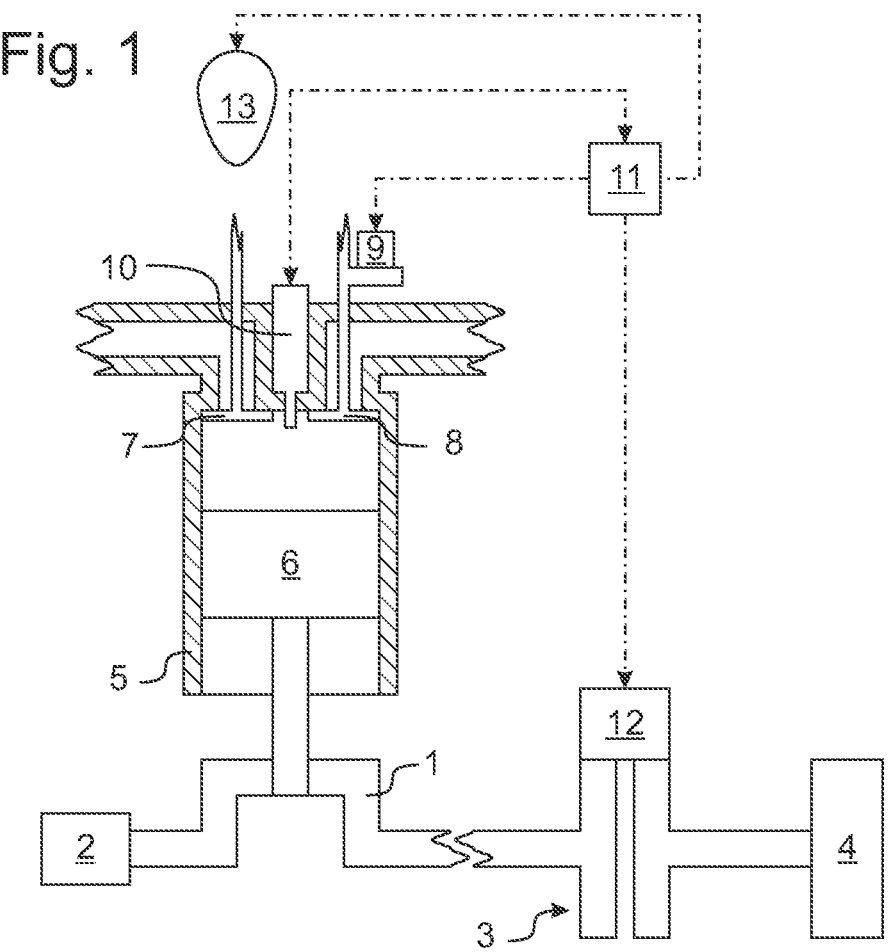
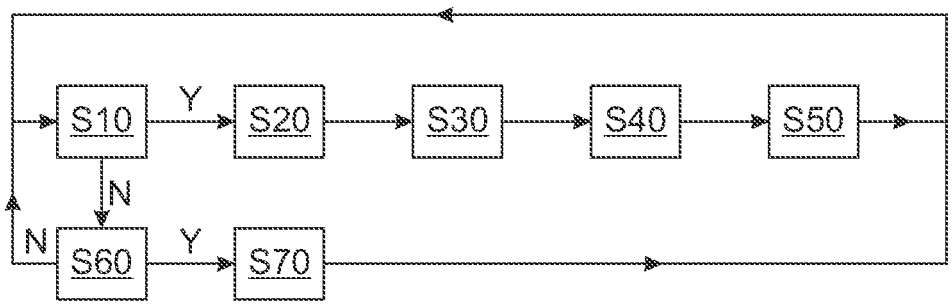

MOTOR VEHICLE DRIVETRAIN CONTROLLER

CROSS-REFERENCE TO RELATED APPLICATION

This application claims priority to German Patent Application No. 102016002051.2, filed Feb. 22, 2016, which is incorporated herein by reference in its entirety.

TECHNICAL FIELD

The present disclosure pertains to a method for controlling a drivetrain of a motor vehicle, which includes a reciprocating engine and at least one driving vehicle wheel that can be coupled with the reciprocating engine, as well as a system, motor vehicle and computer program product for implementing the method.

BACKGROUND

A cylinder of a reciprocating engine in a drivetrain of a motor vehicle can perform work in a traction mode via a combustion stroke for driving one or more driving vehicle wheels. By contrast, work must be expended to compress gas in the cylinder in a compression stroke. Pump losses may build up a resistance in an intake and ensuing exhaust stroke. This can yield a respective resistance (torque) moment of the reciprocating engine.

If a reciprocating engine is tow-started, such a resistance moment can brake the rolling motor vehicle to an undesirably strong extent. In like manner, if a reciprocating engine is driven by driving vehicle wheels in the coasting mode, such a resistance moment can brake the rolling motor vehicle to an undesirably strong extent, especially in order to drive an electrical generator coupled therewith.

SUMMARY

The present disclosure is directed to improved operation of a motor vehicle or its operation. In an embodiment of the present disclosure provides a method for controlling a drivetrain of a motor vehicle having a reciprocating engine and one or more driving vehicle wheels that can be coupled with the reciprocating engine. The engine may be activated in a start mode for starting the reciprocating engine with rolling the driving vehicle wheel(s) or a coasting mode for driving an ignited or unignited reciprocating engine with the rolling driving wheel(s).

In an embodiment of the present disclosure, a system for controlling a drivetrain of a motor vehicle having a reciprocating engine and one or more driving vehicle wheels that can be coupled with the reciprocating engine, is set up in terms of hardware and/or software, for example programming, which when executed on a controller, is configured to implement a method described herein. In particular, the system is configured to activate a start mode for starting the reciprocating engine with the rolling driving vehicle wheel(s), or activating a coasting mode for driving the ignited or unignited reciprocating engine with the rolling driving vehicle wheel(s).

In an embodiment, the reciprocating engine is a two- or four-stroke engine with one or more cylinders, such as a spark ignition or diesel engine.

In an embodiment, the engine is couplable with an electric generator for charging an energy store of the motor vehicle and/or supplying an electrical system of the motor vehicle in the coasting mode.

In an embodiment, the start mode is activated if an end sailing condition is present or detected for ending a so-called sailing mode of the motor vehicle, in which the motor vehicle rolls with the unignited reciprocating engine decoupled from the driving vehicle wheel(s), in order to thereby economize on fuel. Accordingly, the system is configured to activate the start mode if an end sailing condition is present or detected for ending a so-called sailing mode of the motor vehicle. For example, the end sailing condition can encompass: pressing a gas pedal or brake pedal; dropping below a variable, prescribed minimum speed of the motor vehicle; or the like. In an embodiment, the start mode is used for the so-called tow-starting of the reciprocating engine via the inertia of the motor vehicle or the rolling driving vehicle wheel(s).

In an embodiment, the coasting mode is activated if a start coasting condition is present or detected for beginning a so-called coasting mode of the motor vehicle, in which the motor vehicle or the driving vehicle wheel(s) drive the in particular ignited or unignited reciprocating engine coupled thereto. Accordingly, the system is configured to activate the coasting mode if a start coasting condition is present or detected for beginning a so-called coasting mode of the motor vehicle. In an embodiment, the coasting mode is used for driving a generator coupled with the reciprocating engine via the inertia of the motor vehicle or the rolling driving vehicle wheel(s). For example, the start coasting condition can encompass: a complete or partial closure of a coupling between the driving vehicle wheel(s) and reciprocating engine; or the like, for recuperating or driving a generator coupled with the reciprocating engine.

In an embodiment of the present disclosure, the method may include executing one or several (respective) volume-reducing strokes or (piston) strokes of one or several cylinders of the reciprocating engine, in particular immediately or directly following an intake stroke, in or due to the started operating mode, in which the (respective) cylinder is at least intermittently open or opened. Accordingly, the system is configured to execute one or more (respective) volume-reducing strokes or (piston) strokes of one or several cylinders of the reciprocating engine, immediately or directly following an intake stroke, in or due to the started operating mode, in which this (respective) cylinder is at least intermittently open or opened.

In an embodiment, the compression work, and hence resistance moment (torque) of the reciprocating engine can be reduced given a stroke that follows an intake stroke by at least intermittently opening a cylinder, instead of having the cylinder be closed as in a regular compression stroke.

In an embodiment of the present disclosure, the method additionally or alternatively includes executing one or several (respectively) volume-enlarging strokes or (piston) strokes of one or several other or additional, cylinders of the reciprocating engine, which is (respectively) followed immediately or directly by a compression stroke of this cylinder, and a (respective) volume-reducing stroke of this cylinder, which immediately or directly follows an expansion stroke that immediately or directly follows this compression stroke, in or due to the started operating mode, in which this cylinder in this volume-enlarging or volume-reducing stroke is (respectively) closed, if possible. Accordingly, the system is configured to execute one or several (respectively) volume-enlarging strokes or (piston) strokes of one or several other or additional, cylinders of the reciprocating engine, which is (respectively) followed immediately or directly, by a compression stroke of this cylinder, and a (respective) volume-reducing stroke of this cylinder, which immediately or directly follows an expansion stroke that immediately or directly follows this compression stroke, in the or due to the started operating mode, in which this cylinder in this volume-enlarging or volume-reducing stroke is (respectively) closed, if possible.

In an embodiment, the pump loss, and hence resistance moment (torque) of the reciprocating engine can be reduced given another or additional cylinder by having the cylinder remain closed, if possible, instead of having the respective cylinder be at least intermittently, in particular maximally, opened as in a regular intake and ensuing exhaust stroke.

In an embodiment, a cylinder is closed (during execution of a stroke) if possible or as far as possible when it has been closed as far as it can be from the standpoint of construction or control technology within the framework of a valve, camshaft, controller, etc. Accordingly, a cylinder is closed (during execution of a stroke), if possible, in an embodiment, if or in that its inflow and outflow volume or the time integral over its (flow-through) opening cross section has been reduced (during execution of a stroke) to the maximum extent (possible) or as far as possible from the standpoint of construction and/or control technology, within the framework of a valve, camshaft, controller etc. or its adjustment range. In particular, in an embodiment, a cylinder, which is closed, if possible, during execution of a stroke, includes minimally opened or, in particular within the framework of a valve, in particular camshaft, controller, closed, if possible, inlet and outlet valve. In a further development, a cylinder, which is closed, if possible, during execution of a stroke, is a cylinder that is at least essentially completely closed during execution of the stroke. In an embodiment, a cylinder is kept closed to the extent possible during execution of a stroke if or in that its inflow or outflow or outlet volume or the time integral of its (flow-through) opening cross section is maximally reduced over the stroke within the framework of a valve, camshaft, controller etc. or its adjustment range, in particular its inlet and outlet valves are open to the least extent possible or minimally, in particular not at all.

Both respective aspects can be realized separately or even in combination with each other, in that one or several cylinders given (respective) volume-reducing strokes following an intake stroke are at least partially opened, and additionally in parallel, one or several other cylinders are or will be closed, if possible, given volume-enlarging strokes, which are followed by a (respective) compression stroke, which is followed by a (respective) expansion stroke, and the (respective) volume-reducing stroke that follows the latter.

In an embodiment, a volume of the cylinder is enlarged in an intake stroke by a piston running therein. The cylinder is intermittently opened by one or several inlet valves to aspirate fresh air or an air-fuel mixture. In an embodiment, a volume of the cylinder is reduced in a compression stroke by a piston running therein. The cylinder may be closed in a further development to compress fresh air or an air-fuel mixture. In an embodiment, a volume of the cylinder is enlarged in an expansion stroke by a piston running therein. The cylinder is closed in a further development, with the piston in one embodiment being driven by the ignited air-fuel mixture in an expansion stroke. In an embodiment, a volume of the cylinder is reduced in an exhaust stroke by a piston running therein. The cylinder is intermittently opened by one or several outlet valves to discharge exhaust gas or air.

In an embodiment, the method may include at least intermittently opening or keeping open one or several (respective) decompression element, in particular one or several (respective) inlet and/or outlet valves, of the cylinder(s) during the volume-reducing stroke(s) following the intake stroke, by one or several, independent or separate and/or electrical, electromagnetic, hydraulic and/or pneumatic actuators and/or by electrically, electromagnetically, hydraulically and/or pneumatically adjusting a variable valve, camshaft, controller etc., which (variably) controls one or several (respective) inlet and/or outlet valves of the cylinder, in particular (variably) couples it with a crankshaft of the reciprocating engine.

In an embodiment, the system is configured to at least intermittently opening or keeping open one or several (respective) decompression elements, in particular one or several (respective) inlet and/or outlet valves, of the cylinder(s) during the volume-reducing stroke(s) following the intake stroke, by one or several independent or separate and/or electrical, electromagnetic, hydraulic and/or pneumatic actuators and/or by electrically, electromagnetically, hydraulically and/or pneumatically, adjusting a variable valve, camshaft, controller etc., which (variably) controls one or several (respective) inlet and/or outlet valves of the cylinder, in particular (variably) couples it with a crankshaft of the reciprocating engine. In a further development, the system is configured with the decompression elements, the actuator(s) and/or the valve, camshaft, controller etc.

In an embodiment, this makes it possible to reduce compression work in a targeted, precise and/or reliable manner. One or several actuators, in particularly ones independent of a camshaft controller, in particular valve lifters or the like, can be used in one embodiment to independently and/or very variably open or close the cylinder. By adjusting the valve, in particular the camshaft, controller, the latter can assume an additional functionality in an embodiment.

In an embodiment, the method additionally or alternatively includes keeping all valves of the cylinder(s) closed, if possible, during the volume-enlarging strokes, which is followed by the (respective) compression stroke, and during the volume-reducing stroke, which follows the (respective) expansion stroke that follows the (respective) compression stroke, by one or several independent or separate and/or electrical, electromagnetic, hydraulic and/or pneumatic actuators and/or by electrically, electromagnetically, hydraulically and/or pneumatically, adjusting a variable valve, in particular a camshaft, controller, which (variably) controls one or several (respective) inlet and/or outlet valves of the cylinder, in particular (variably) couples it with a crankshaft of the reciprocating engine.

In an embodiment, the system is configured to keep all valves of the cylinder(s) closed, if possible, during the volume-enlarging strokes, which is followed by the (respective) compression stroke, and during the volume-reducing stroke, which follows the (respective) expansion stroke that follows the (respective) compression stroke, by one or several independent or separate and/or electrical, electromagnetic, hydraulic and/or pneumatic actuators and/or by electrically, electromagnetically, hydraulically and/or pneumatically, adjusting an in particular variable valve, in particular a camshaft, controller, which (variably) controls one or several (respective) inlet and/or outlet valves of the cylinder, in particular (variably) couples it with a crankshaft of the reciprocating engine. In a further development, the system includes the valve(s), the actuator(s) and/or the valve, in particular camshaft, controller.

In an embodiment, this makes it possible to reduce pump loss in a targeted, precise and/or reliable manner. One or several actuators, in particularly ones independent of a camshaft controller, in particular valve lifters or the like, can be used in one embodiment to independently and/or very variably open or close the cylinder. By adjusting the camshaft controller, the latter can assume an additional functionality in an embodiment.

In an embodiment, the decompression element may be opened for at least 1%, in particular at least 10%, especially at least 50%, in particular at least 75%, of the one or several volume-reducing strokes. In an embodiment, the system accordingly is configured to open the decompression element for at least 1%, especially at least 50%, in particular at least 75%, of the one or several volume-reducing strokes. In an embodiment, this makes it possible to advantageously reduce compression work.

In an embodiment, the decompression element is (again) closed during the volume-reducing stroke. In an embodiment, the system is configured to close the decompression element during the volume-reducing stroke. In an embodiment, an advantageous compression in the cylinder can be realized in this way so as to ignite the latter in a further development and/or improve an ensuing expansion stroke.

In an embodiment, one or more expansion strokes, which immediately or directly (respectively) follow a volume-reducing stroke that (respectively) follows an intake stroke with at least intermittently open cylinder, may be executed unignited, in particular without fuel. In an embodiment, the system is configured to execute one or more unignited or no-fuel expansion strokes, which immediately or directly (respectively) follow the or a volume-reducing stroke that (respectively) follows an intake stroke with at least intermittently open cylinder. As a consequence, one or more of the cylinders may be at least intermittently opened during the execution of at least one volume-reducing stroke following an intake stroke are in one embodiment unignited cylinders. In an embodiment, this makes it possible to reduce the compression work of unignited cylinders, and hence in a further development a resistance of the reciprocating engine, with reduced or no impairment to its operating performance, its startup and/or exhaust output.

Additionally or alternatively, the expansion strokes, which immediately or directly (respectively) follow a volume-reducing stroke that (respectively) follows an intake stroke with at least intermittently open cylinder, may be executed unignited. In an embodiment, the system is configured to ignite one or more expansion strokes, which immediately or directly (respectively) follow the or a volume-reducing stroke that (respectively) follows an intake stroke with at least intermittently open cylinder. As a consequence, the cylinders may be at least intermittently opened during the execution of at least one volume-reducing stroke following an intake stroke are in one embodiment ignited cylinders. In an embodiment, intermittently or partially decompressing an ignited cylinder allows the latter to already start and/or perform (reduced) work while simultaneously reducing its resistance. In an embodiment, the operating performance of the reciprocating engine can be improved, in particular its startup and/or exhaust output.

In an embodiment, one or more expansion strokes, which are followed immediately or directly by the or a (respective) volume-reducing stroke with an if possible closed cylinder, may be executed unignited without fuel. In an embodiment, the system is configured execute an unignited, expansion of one or more strokes, which are followed immediately or directly by the or a (respective) volume-reducing stroke with a closed, if possible, cylinder. As a consequence, one or more cylinders that may be closed, if possible, during the execution of the volume-enlarging and -reducing stroke before or after the compression and expansion stroke are in one embodiment unignited cylinders. In an embodiment, this makes it possible to reduce a pump loss by unignited cylinders.

In an embodiment, the method includes a complete or partial or dragging closure of a coupling between the driving vehicle wheel(s) and reciprocal engine with the at least intermittently opened cylinder(s) during the execution of the volume-reducing stroke(s) that follow the (respective) intake stroke and/or with the closed, if possible, cylinder(s) during the execution of the (respective) volume-enlarging stroke(s), which are followed by a respective compression stroke, and the volume-reducing stroke, which follows an expansion stroke that follows this compression stroke in the or due to the started operating mode.

In an embodiment, the system is configured to completely or partially or draggingly close a coupling between the driving vehicle wheel(s) and reciprocal engine with the at least intermittently opened cylinder(s) during the execution of the volume-reducing stroke(s) that follow the (respective) intake stroke and/or with the closed, if possible, cylinder(s) during the execution of the (respective) volume-enlarging stroke(s), which are followed by a respective compression stroke, and the volume-reducing stroke, which follows an expansion stroke that follows this compression stroke in the or due to the started operating mode. In a further development, the system includes the coupling or an actuator for opening and closing the coupling. In an embodiment, this makes it possible to tow-start the reciprocal engine, and start it in the process as a result. In an embodiment, a partial or dragging closure of the coupling can here (further) reduce a resistance or load moment (torque), while a complete closure reduces wear on the coupling.

In a further development, the method includes renewed closing of the coupling, in particular complete opening of the coupling, starting of a self-propulsion and/or increasing of a speed of the reciprocal engine (now once again completely) decoupled from the driving vehicle wheel(s), and subsequent, in particular complete, closure of the coupling in or due to the started operating mode. In an embodiment, the system is configured to, following the closure of the coupling, renew a complete opening of the coupling at the starting of a self-propulsion and/or increasing of a speed of the reciprocal engine (now once again completely) decoupled from the driving vehicle wheel(s), and subsequent, in particular complete, closure of the coupling in or due to the started operating mode.

In an embodiment, a renewed decoupling of the tow-started reciprocal engine makes it possible to subsequently start its self-propulsion or independent operation or running independently of the driving vehicle wheel(s), in particular (only) by the kinetic energy of the reciprocal engine absorbed during the tow-start. In an embodiment, this makes it possible to reduce, in particular avoid, a retroactive effect on the driving vehicle wheel(s).

To this end, the coupling in one embodiment is opened once or because a prescribed minimum speed of the reciprocal engine has been reached, the self-propulsion is started by the kinetic energy supplied to the at least partially coupled reciprocal engine during its preceding tow-start, and the coupling is subsequently closed again. The minimum speed may be prescribed in a further development in such a way that the kinetic energy of the reciprocal engine is sufficient for starting its self-propulsion.

In an embodiment, the system is configured to open the coupling once or because a prescribed minimum speed of the reciprocal engine has been reached, starting the self-propulsion by the kinetic energy supplied to the at least partially coupled reciprocal engine during its preceding tow-start, and subsequently closing the coupling. The minimum speed may be prescribed in a further development in such a way that the kinetic energy of the reciprocal engine is sufficient for starting its self-propulsion.

By increasing the speed of the decoupled, in particular independently running, reciprocating engine, the latter can in one embodiment initially be accelerated separately from the driving vehicle wheel(s), and only coupled (once again) with the latter once a suitable coupling speed has been reached. In an embodiment, this makes it possible to reduce or avoid a retroactive effect on the driving vehicle wheel(s).

In an embodiment, a resistance moment (torque) of the reciprocating engine can be reduced in the present disclosure by reducing the compression work in one or several cylinders in one or several ignited and/or unignited strokes that respectively follow an intake stroke and/or reducing pump losses in one or several cylinders in one or several unignited stroke (cycles) by executing strokes with the cylinder closed, if possible. In an embodiment, this makes it possible for the motor vehicle to roll further, reduce the fuel consumption of the reciprocating engine or motor vehicle, and/or improve the recuperation or energy recovery by driving a generator coupled with the reciprocating engine.

In the sense of the present disclosure, the system can be configured as hardware or software, such as a controller or digital processor, in particular a microprocessor unit (CPU) preferably linked in terms of data or signals with a storage and/or bus system, and/or one or several programs or program modules. The CPU can be designed to process commands that are implemented as a program archived in a storage system, acquire input signals from a data bus and/or deliver output signals to a data bus. A storage system can include one or several, various, storage media, such as optical, magnetic, solid state and/or other nonvolatile media. The program can be constructed in such a way that it can embody or implement the methods described herein, so that the CPU can execute the method, and thus control a drivetrain of a motor vehicle, which includes a reciprocating engine and at least one driving vehicle wheel that can be coupled with the reciprocating engine. In an embodiment, one or several of the steps in the method are implemented partially or completely automated, in particular by the system or its components set up for this purpose.

BRIEF DESCRIPTION OF THE DRAWINGS

The present disclosure will hereinafter be described in conjunction with the following drawing figures, wherein like numerals denote like elements.

FIG. 1 shows a system for controlling a drivetrain of a motor vehicle according to an embodiment of the present disclosure, and FIG. 2 shows a method for controlling the drivetrain according to an embodiment of the present disclosure.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

FIG. 1 shows a system for controlling a drivetrain of a motor vehicle according to an embodiment of the present disclosure. The drivetrain includes a reciprocating engine with a crankshaft 1, which is coupled with the generator 2 on the one hand, and can be coupled with driving vehicle wheels by a coupling 3 on the other, of which only a single driving vehicle wheel 4 is exemplarily shown on FIG. 1.

The reciprocating engine includes several structurally identical cylinders, of which only a single cylinder 5 is shown on FIG. 1, and in which reference is made to its description as relates to the other cylinders.

The cylinder 5 includes a piston 6, which is coupled in a known manner with the crankshaft 1, so as to drive the latter in a combustion or expansion stroke, and conversely to be moved by the crankshaft 1 in the cylinder 5 in volume-reducing strokes, in particular compression and/or exhaust strokes, and volume-enlarging strokes, in particular intake strokes. In the exemplary embodiment, the cylinder 5 includes an inlet valve 7 and an outlet valve 8. In addition, it includes a fuel/ignition system 10 for supplying fuel and/or igniting an air-fuel mixture in the cylinder 5.

The system further includes an ECU 11, which is linked in terms of signals with an actuator 12 for actuating the coupling 3, an actuator 9 for opening the outlet valve 8, for example in the form of a separate electrical electromagnetic, hydraulic or pneumatic valve lifter, as well as a variable camshaft controller 13, that actuates the latter. The ECU 11 implements a method explained below with reference to FIG. 2 for controlling the drivetrain according to an embodiment of the present disclosure.

At S10, the ECU 11 checks whether an end sailing condition has been satisfied, for example by actuating a gas or brake pedal (not shown) during a sailing mode of the motor vehicle, and in this event activates a start mode for tow-starting the reciprocating engine with the driving vehicle wheels 4, or maintains this start operating if it has already been activated.

If the start mode has been activated (S10: "Y"), the ECU 11 at S20 correspondingly activates the (respective) actuator 9 to open one or several of the cylinders 5 or their outlet valves 8 for one or several volume-reducing strokes that directly follow a respective intake stroke intermittently, for example for at least 10% of the volume-reducing stroke.

In addition, the ECU 11 at S20 correspondingly adjusts the camshaft controller 13 to keep other of the cylinders closed, if possible, and in a further development completely, in a respective volume-enlarging stroke for one or several cycles, which is followed by a compression stroke, which is followed by an expansion stroke, and a volume-reducing stroke that follows the latter. These expansion strokes are executed unignited and without supplying fuel to these cylinders. In addition, the ECU 11 at S20 correspondingly activates the actuator 12 to partially close the coupling 3, and thereby tow-starts the reciprocating engine.

In a step S30, the ECU 11 correspondingly activates the actuator 12 to again open the coupling 3, for example after reaching a prescribed minimum speed of the reciprocating engine, at which its kinetic energy is sufficient to start a self-propulsion.

In a step S40, the ECU 11 correspondingly activates the (respective) actuator 9 to further open one or several of the cylinders 5 or their outlet valves 8 for one or more volume-reducing strokes that directly follow a respective intake stroke intermittently, for example for at least 10% of the volume-reducing stroke, and additionally correspondingly adjusts the camshaft controller 13 to keep other of the cylinders closed, if possible, and in a further development completely, in a respective volume-enlarging stroke for one or several cycles, which is followed by a compression stroke, which is followed by an expansion stroke, and a volume-reducing stroke following the latter.

As opposed to S20, one or several of the cylinders 5 that the ECU 11 intermittently opens for one or several of the respective volume-reducing strokes that directly follow an intake stroke are ignited at S40, in that fuel or an air-fuel mixture is supplied to them, and the latter is ignited by ignition means or itself, so that a self-propulsion of the reciprocating engine is started at S40, and the latter subsequently runs automatically. Accordingly, in particular expansion strokes of these cylinders 5, which follow the respective volume-reducing stroke that follows the intake stroke, are ignited in design at S40, while in particular expansion strokes of the cylinders 5 that are intermittently open in volume-reducing strokes that follow the intake stroke, and follow the respective volume-reducing stroke that follows the intake stroke, are unignited in design at S20.

In at S50, the ECU 11 then correspondingly activates the actuator 12 to close the coupling 3 again, if necessary after increasing the speed of the automatically running reciprocating engine to approximate a speed of the driving wheels 4, and thereby couples the reciprocating engine driving wheels 4. It then returns back to step S10.

As evident, the measures in particular at S20 and/or S40 reduced the compression work and pump losses in the corresponding cylinders, and thereby reduced a resistance of the reciprocating engine during a tow-start. An undesired retroactive effect on the driving wheels 4 can be further reduced by having initially just a partial or dragging coupling with the driving wheels 4, and by starting the self-propulsion with the reciprocating engine decoupled again using its kinetic energy absorbed during the tow-start.

If the start mode is not activated (S10: "N"), the ECU 11 in at S60 checks whether a coasting start condition has been satisfied, for example a drive (twisting) moment of the driving vehicle wheels 4 is larger than the drive (twisting) moment of the reciprocating engine, and in this case activates a coasting mode or retains this coasting mode if it has already been activated. Otherwise (S60: "N"), it returns back to step S10.

If the coasting mode has been activated (S60: "Y"), the ECU 11 at S70 correspondingly activates the (respective) actuator 9 to open one or several of the cylinders 5 or their outlet valves 8 for one or several of the volume-reducing strokes that directly follow a respective intake stroke intermittently, for example for at least 10% of the volume-reducing stroke. In addition, the ECU 11 at S70 correspondingly adjusts the camshaft controller 13 to keep other of the cylinders closed, if possible, for one or several cycles of a respective volume-enlarging stroke, a compression stroke following the latter, an expansion stroke following the latter, and a volume-reducing stroke following the latter.

It then returns back to step S10.

As evident, these measures in particular at S70 once again reduced both the compression work and pump losses in the corresponding cylinders, and thereby reduced a resistance of the reciprocating engine in the coasting mode for driving the generator 2. The reciprocating engine at S70 can here be either ignited or unignited. In an embodiment, this makes it possible for the motor vehicle to continue rolling, reduce the fuel consumption of the reciprocating engine or motor vehicle, and/or improve the recuperation or energy recovery by driving a generator coupled with the reciprocating engine.

Even though exemplary embodiments were explained in the preceding specification, let it be noted that a plurality of modifications is possible. For example, at S20, S40 and/or S70, even just a single or several respective cylinder(s) 5 or their outlet valves 8 can be kept open for one or several respective volume-reducing strokes that directly follow an intake stroke intermittently, for example for at least 10% of the volume-reducing stroke, or instead only one or several cylinder(s) can be kept closed, if possible, for one or several cycles in a respective volume-enlarging stroke, which is followed by a compression stroke, which is followed by an expansion stroke, and a volume-reducing stroke that follows the latter.

Additionally or alternatively, the coupling at S20 can be completely closed, and/or the reciprocating engine can already be ignited at S20, so that it subsequently runs automatically. In particular, in a modification at S40, i.e., after again decoupled from the driving wheels 4, it can automatically be accelerated to a prescribed speed, and then be coupled with the driving wheels 4 again, so as to drive the latter.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A method for controlling a drivetrain of a motor vehicle including a reciprocating engine and a vehicle wheel selectively coupled with the reciprocating engine, the method comprising:
    actuating a driven mode of the drivetrain, wherein the vehicle wheel at least partially drives a crankshaft of the reciprocating engine such that a piston operably coupled to the crankshaft repeatedly cycles through a first expansion stroke, a first reduction stroke, a second expansion stroke and a second reduction stroke; and
    actuating a resistance-reducing mode to reduce the compression work and pump loss of the reciprocating engine including:
        opening a decompression element during the first reduction stroke following the first expansion stroke for at least one cycle of the reciprocating engine thereby providing an intermittently open cylinder; and
        closing the decompression element through the first expansion stroke and the second reduction stroke for at least one cycle of the reciprocating engine thereby providing a closed cylinder.

2. The method according to claim 1, wherein the decompression element is open for at least 1% of the first reduction stroke.

3. The method according to claim 1, further comprising initiating a self-propulsion mode for automatically running the reciprocating engine by introducing an air-fuel mixture into the cylinder during the first expansion stroke, closing the decompression element during the first reduction stroke and selectively igniting the second expansion stroke.

4. The method according to claim 1, further comprising at least partially decoupling a coupling between the vehicle wheel and the reciprocating engine with the intermittently open cylinder.

5. The method according to claim 4, further comprising at least partially coupling the coupling between the vehicle wheel and the reciprocating engine with the closed cylinder.

6. The method according to claim 5, further comprising:
decoupling the reciprocating engine from the vehicle wheel;
starting one of a self-propulsion or a speed increase of the reciprocating engine, and
re-coupling the reciprocating engine to the vehicle wheel.

7. A non-transitory computer readable medium comprising a program code, which when executed on a computer, is configured to execute the method according to claim 1.

8. The method of claim 1, wherein the driven mode is selected from a group consisting of a start mode for tow-starting the reciprocating engine via the vehicle wheel and a coast mode for driving the reciprocating engine via the vehicle wheel.

9. The method according to claim 1, wherein the decompression element comprises a valve.

10. The method according to claim 9, wherein the valve is open for at least 10% of the first reduction stroke.

11. The method according to claim 9, wherein the valve is open for at least 50% of the first reduction stroke.

12. The method according to claim 9, wherein the valve is open for at least 75% of the first reduction stroke.

13. A system for controlling a drivetrain of a motor vehicle having a reciprocating engine and a vehicle wheel selectively coupled with the reciprocating engine, wherein the system comprises an electronic control unit configured to:
actuate a driven mode of the drivetrain, wherein the vehicle wheel at least partially drives a crankshaft of the reciprocating engine such that a piston operably coupled to the crankshaft repeatedly cycles through a first expansion stroke, a first reduction stroke, a second expansion stroke and a second reduction stroke; and
actuate a resistance-reducing mode to reduce the compression work and pump loss of the reciprocating engine including:
opening a decompression element during the first reduction stroke following the first expansion stroke for at least one cycle of the reciprocating engine thereby providing an intermittently open cylinder; and
closing the decompression element through the first expansion stroke and the second reduction stroke for at least one cycle of the reciprocating engine thereby providing a closed cylinder.

14. A motor vehicle comprising a drivetrain having a reciprocating engine and at least one driving vehicle wheel couplable with the reciprocating engine, and an electronic control unit operable for controlling the drivetrain according to claim 13.

15. The system according to claim 13, wherein the decompression element comprises a valve.

16. The system according to claim 15, wherein the valve is open for at least 10% of the first reduction stroke.

17. The system according to claim 15, wherein the valve is open for at least 50% of the first reduction stroke.

18. The system according to claim 15, wherein the valve is open for at least 75% of the first reduction stroke.

19. A system for controlling a drivetrain of a motor vehicle having a reciprocating engine and a vehicle wheel selectively coupled with the reciprocating engine, wherein the system comprises an electronic control unit configured to:
actuate a driven mode of the drivetrain, wherein the vehicle wheel at least partially drives a crankshaft of the reciprocating engine such that a piston operably coupled to the crankshaft repeatedly cycles through a first expansion stroke, a first reduction stroke, a second expansion stroke and a second reduction stroke in an engine cylinder; and
actuate a resistance-reducing mode to reduce the compression work and pump loss of the reciprocating engine including:
opening a valve during the first reduction stroke following the first expansion stroke for at least one cycle of the reciprocating engine to intermittently open the engine cylinder; and
closing the valve through the first expansion stroke and the second reduction stroke for at least one cycle of the reciprocating engine to close the engine cylinder.

* * * * *